(12) United States Patent
Howell et al.

(10) Patent No.: US 7,958,261 B2
(45) Date of Patent: Jun. 7, 2011

(54) DOMAIN NAME CACHE CONTROL SYSTEM GENERATING SERIES OF VARYING NONCE-BEARING DOMAIN NAMES BASED ON A FUNCTION OF TIME

(75) Inventors: Jonathan Ryan Howell, Seattle, WA (US); John R. Douceur, Bellevue, WA (US); Jeremy Eric Elson, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 237 days.

(21) Appl. No.: 12/031,105

(22) Filed: Feb. 14, 2008

(65) Prior Publication Data

US 2009/0210526 A1 Aug. 20, 2009

(51) Int. Cl.
*G06F 15/173* (2006.01)

(52) U.S. Cl. ........ 709/242; 709/238; 709/244; 709/223; 709/224

(58) Field of Classification Search .......... 709/245, 709/246, 223, 214, 242, 238, 244, 224; 370/310; 726/3; 455/435.1; 713/185, 168
See application file for complete search history.

(56) References Cited

U.S. PATENT DOCUMENTS

| | | | |
|---|---|---|---|
| 6,421,732 B1 | 7/2002 | Alkhatib et al. | |
| 6,446,133 B1 | 9/2002 | Tan et al. | |
| 6,681,017 B1 | 1/2004 | Matias et al. | |
| 6,701,329 B1 | 3/2004 | Esibov et al. | |
| 6,775,704 B1 | 8/2004 | Watson et al. | |
| 6,829,654 B1 | 12/2004 | Jungck | |
| 6,892,308 B1 | 5/2005 | Medvinsky | |
| 7,079,499 B1 * | 7/2006 | Akhtar et al. | 370/310 |
| 7,116,654 B2 | 10/2006 | Kim | |
| 7,240,100 B1 * | 7/2007 | Wein et al. | 709/214 |
| 7,251,694 B2 | 7/2007 | Gupta et al. | |
| 7,280,999 B2 | 10/2007 | Chung et al. | |
| 2003/0065763 A1 | 4/2003 | Swildens et al. | |
| 2004/0143579 A1 | 7/2004 | Nakazawa | |
| 2004/0215823 A1 | 10/2004 | Kleinfelter et al. | |
| 2005/0114653 A1 | 5/2005 | Sudia | |
| 2005/0114680 A1 * | 5/2005 | Chinnaswamy et al. | 713/185 |
| 2005/0154837 A1 | 7/2005 | Keohane et al. | |
| 2005/0259645 A1 | 11/2005 | Chen et al. | |
| 2007/0078986 A1 | 4/2007 | Ethier et al. | |
| 2007/0101412 A1 | 5/2007 | Yang et al. | |
| 2007/0283149 A1 * | 12/2007 | Devarapalli | 713/168 |
| 2008/0045214 A1 * | 2/2008 | Wen et al. | 455/435.1 |

(Continued)

OTHER PUBLICATIONS

Giuseppe Ateniese, et al. A New Approach to DNS Security (DNSSEC), CCS'01, Nov. 5-8, 2001, Philadelphia, Pennsylvania, USA. ACM 1-58113-38-5/01/0011 http://www.eecs.umich.edu/~aprakash/eecs588/handouts/dnssec-ateniese.pdf. Last accessed Nov. 12, 2007, 10 pages.

(Continued)

*Primary Examiner* — Le Luu
(74) *Attorney, Agent, or Firm* — Turocy & Watson, LLP

(57) ABSTRACT

Domain name caching is controlled by adding a nonce to a domain name to force propagation of lookup to an authoritative server or service. Desired caching behavior is dictated by controlling when a new and unique nonce-bearing name is created. For example, caching can be completely eliminated by generating a new nonce-bearing name for every request. While a nonce can simply correspond to a random or pseudo random value, it can also be time based. Furthermore, nonces can be phase or time shifted to limit authoritative server load as well as improve response time.

20 Claims, 12 Drawing Sheets

U.S. PATENT DOCUMENTS

| | | |
|---|---|---|
| 2008/0082648 A1 | 4/2008 | Ahmed et al. |
| 2009/0007234 A1* | 1/2009 | Birger et al. ............... 726/3 |
| 2009/0070474 A1 | 3/2009 | Aura et al. |
| 2009/0210526 A1 | 8/2009 | Howell et al. |

OTHER PUBLICATIONS

Reza Curtmola, et al. On the Performance and Analysis of DNS Security Extensions, CANS 2005. http://www.cs.jhu.edu/~crix/publications/PerformanceAndAnalysisDNSSEC.pdf. Last accessed Nov. 12, 2007, 15 pages.

Edith Cohen, et al. Proactive Caching of DNS Records: Addressing a Performance Bottleneck http://www1.cs.columbia.edu/~danr/courses/6762/Summer03/week11/cacheDNS.pdf. Last accessed Nov. 8, 2007, 10 pages.

Jaeyeon Jung, et al. DNS Performance and the Effectiveness of Caching http://www.cs.cmu.edu/~dga/15-744/S07/papers/dns-ton2002.pdf. Last accessed Nov. 12, 2007, 14 pages.

Jeffrey Pang, et al. On the Responsiveness on DNS based Network Control. IMC'04, Oct. 25-27, 2004, Taormina, Sicily, Italy. ACM 1-5811-821-0/04/0011. http://imconf.net/imc-2004/papers/p21-pang.pdf. Last accessed Nov. 12, 2007, 6 pages.

Parikshit Gopalan, et al. Caching with Expiration Times. Http://www.cc.gatech.edu/~mihail/www-papers/soda02.pdf. Last accessed Nov. 12, 2007, 8 pages.

OA dated Apr. 1, 2010 for U.S. Appl. No. 12/035,652, 39 pages.

* cited by examiner

DOMAIN NAME CACHE CONTROL SYSTEM GENERATING SERIES OF VARYING NONCE-BEARING DOMAIN NAMES BASED ON A FUNCTION OF TIME

BACKGROUND

Domain names facilitate human interaction within the electronic world. A domain name is a combination of unique and memorable alphanumeric characters employed to identify or address one or more computers. Conventionally, domain names are a component of Uniform Resource Locators (URLs) associated with navigating the World Wide Web ("web") as well as a component of electronic mail ("email") addresses for sending and receiving electronic correspondence. In a URL, the domain name is the unique name ending with a top-level name such as "com" (e.g., "www.example.com," "example.com," "example.org" . . . ). In an email address, the domain name follows the "@" symbol (e.g., "example.com" in "jjones@example.com").

Electronic devices including computers and routers utilize Internet Protocol (IP) address rather than domain names for communication. IP addresses are unique numerical values that identify a specific location similar to the way a house address identifies a particular house on a street. In terms of format, the 32-bit values are often represented as doted decimal number to make it easy for humans to read including four octets separated by dots (e.g., 208.77.188.166). In addition to facilitating readability, the octets are used to help define classes of IP addresses for assignment to specific entities or purposes. Electronic devices employ such an addressing scheme to transmit data amongst one another across a network, for instance.

A domain name system or service (DNS) is employed to translate user entered domain names to computer comprehendible IP addresses. A DNS system is essentially a very large database system that maps domain names to IP addresses. Upon receipt of a domain name entered or designated by a user, an application such as a web browser can request the services of a DNS system. The DNS system acquires an IP address associated with a passed domain name and transmits it back to the requesting application. The IP address can subsequently be employed by the application to send or receive data. Overall, the DNS system provides a convenience to users by enabling use of memorable domain names rather than requiring utilization of forgettable IP addresses.

Accessing a DNS system for every electronic transmission is inefficient and over burdensome on the system itself. As a result, mappings between domain names and IP addresses are cached at various levels. For example, a client operating system or application and/or network host, among others, can save mapping information for later reference. By avoiding a DNS lookup, transactions are much faster especially considering the number of lookups that would otherwise be required.

Caching provides both favorable and unfavorable consequences. On one hand, caching expedites processing since once a mapping is retrieved an expensive acquisition transaction is not required. However, caching also reduces responsiveness to change. In some cases, domain name to IP address mappings change when a server fails or systems are scaled up or down, for instance. As a result, changes will not be available and systems will appear to stop working or work intermittently.

DNS protocol addresses this issue with a time to live (TTL) field or value. The TTL value, set by a domain publisher, for example, identifies an expiration time for a domain name/IP address mapping, ranging from seconds to weeks or longer. Upon expiration, the cached version is to be discarded, a DNS lookup performed, and the new mapping cached. The benefits of caching can therefore be balanced against responsiveness to change by selecting a reasonable TTL value.

Nevertheless, some Internet architecture components (e.g., intermediate DNS caches at Internet Service Providers, or client software) violate the DNS protocol by caching DNS records for periods beyond the specified expiration time. Occurrence of this misbehavior in practice makes DNS impractical to use for applications for which it was designed.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to control of DNS caching. Caching of domain name to IP address mappings can improve response time and reduce load on network resources. However, lengthy caching can negatively affect responsiveness to changes in mappings. In accordance with an aspect of the disclosure, a nonce is introduced as a mechanism to restore to server operators precise control over caching; especially transparent caching.

More particularly, a nonce is injected within a domain name to confound caching. At least initially, the new nonce-bearing domain name is unlikely to have been cached forcing propagation back to an authoritative domain name server/service. The degree of responsiveness can be controlled by specification of when and/or how often the nonce changes (e.g., every request, per client session . . . ). The more often lookup is performed at the authoritative server, the more responsive the system will be to change.

According to one aspect of the disclosure, the nonce can identify or be associated with an expiration period (e.g., seconds, hours, days . . . ). Further yet, load on the authoritative server can be managed by time shifting expiration periods to eliminate spikes in demand.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Systems and methods that pertain to controlling domain name caching are described in detail hereinafter. It has been observed that DNS records are being cached for lengthy periods of time including beyond specified expiration times (TTLs). As a result, mapping changes are not effectuated rapidly causing clients to experience delays, timeouts, or other failures.

Nonce-bearing domain names are employed to control DNS caching. More particularly, a unique identifier is generated and prepended to or otherwise included with the domain name to force propagation of a lookup to an authoritative server. Control is affected as a function of nonce-bearing name generation including the timing of the generation itself. Furthermore, time or phase shifting can be employed to effectively distribute load across an authoritative DNS server as well as improve response time, among other things.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
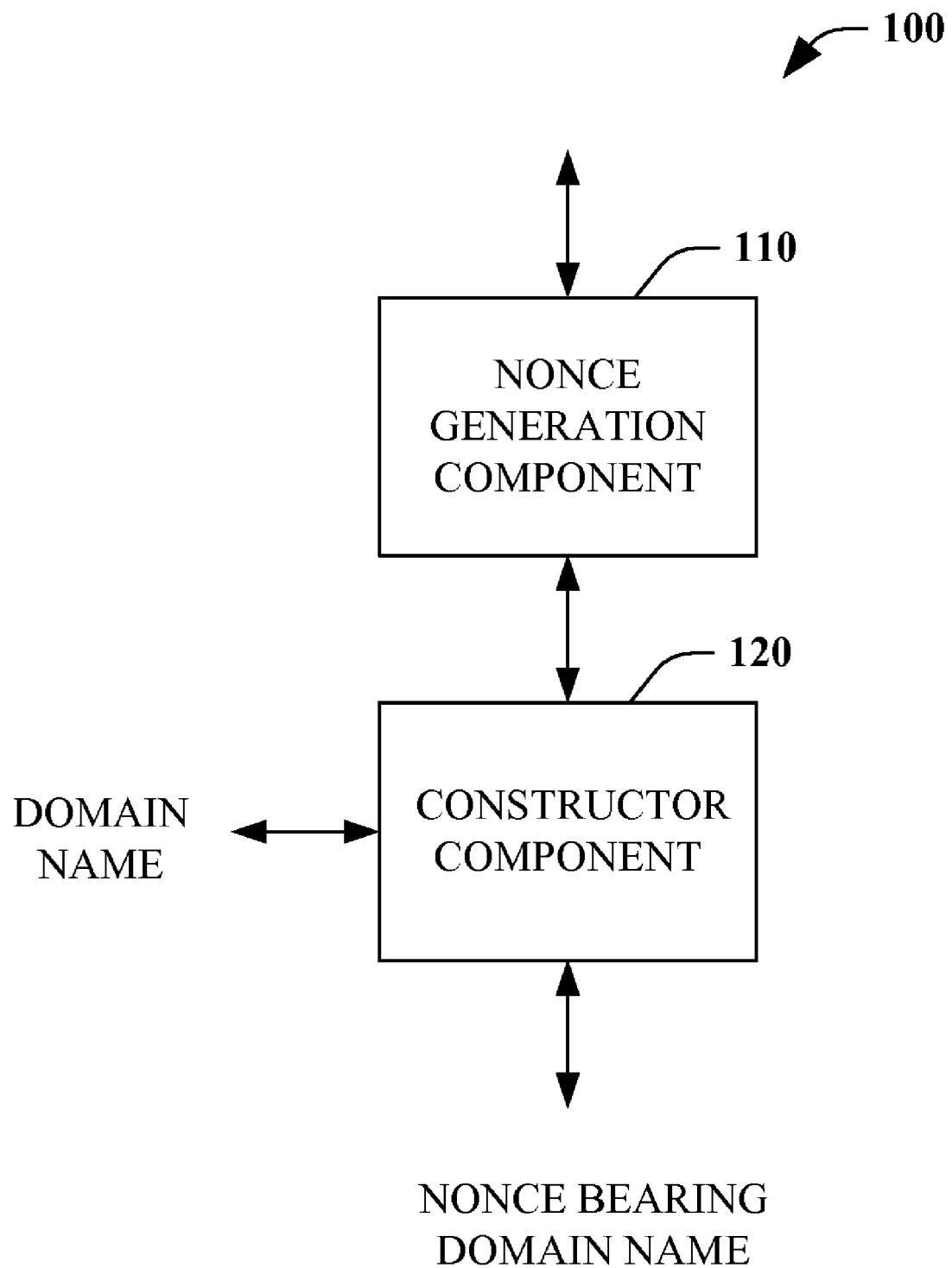
FIG. 1 is a block diagram of a domain name generation system in accordance with an aspect of the subject disclosure.

Referring initially to FIG. 1, a domain name generation system 100 is illustrated according to an aspect of the claimed subject matter. The system 100 generates a unique nonce-bearing domain name utilizing nonce generation component 110 and constructor component 120. Among other things, this name can be employed to confound caching as will be described further infra.

The nonce generation component 110 produces a unique identifier or nonce. The identifier can comprise numbers, symbols, and/or characters, among other things. The only requirement is that the identifier be unique or distinguishing. Furthermore, the identifier need not be unique for all time. For example, rollover may be allowed after a given period of time and after all combinations have been exhausted. In addition, the nonce can be meaningful or completely meaningless. Still further yet, it is to be noted that the nonce can be generated by a self-contained function and/or method or influenced by outside factors.

The constructor component 120 receives, retrieves, or otherwise obtains or acquires a domain name and produces a nonce-bearing domain name. An acquired domain name refers, among other things, to a memorable hostname that maps to an IP address. Domain names form part of website URLs and email addresses, inter alia. The constructor component 120 can add or append a nonce to a domain name. Similarly, the constructor component 120 can alter a nonce-bearing domain name or append a new nonce. In any event, the resultant domain name is now unique by virtue of the added nonce.

By way of example, suppose the constructor component 120 received the domain name "example.com." Upon receipt, the constructor component 120 could request and acquire a nonce from the nonce generation component 110 such as "1245780." Subsequently, the constructor component 120 can append the nonce to the domain name to produce "1245780.example.com."

As will be appreciated from later description, by altering a domain name by including a unique identifier, caching and/or the use of cache can be controlled. For instance, the original domain name "example.com" and nonce-bearing name "1245780.example.com" can map to the same IP address. By adding the nonce, the domain name is different forcing lookup of the IP address rather than utilizing a cached value associated with the original domain name. Consequently, any changes to the domain name to IP address mapping that may occur will be captured by the lookup. Similarly, lookups can be forced by changing the nonce associated with a domain.

Figure 2:
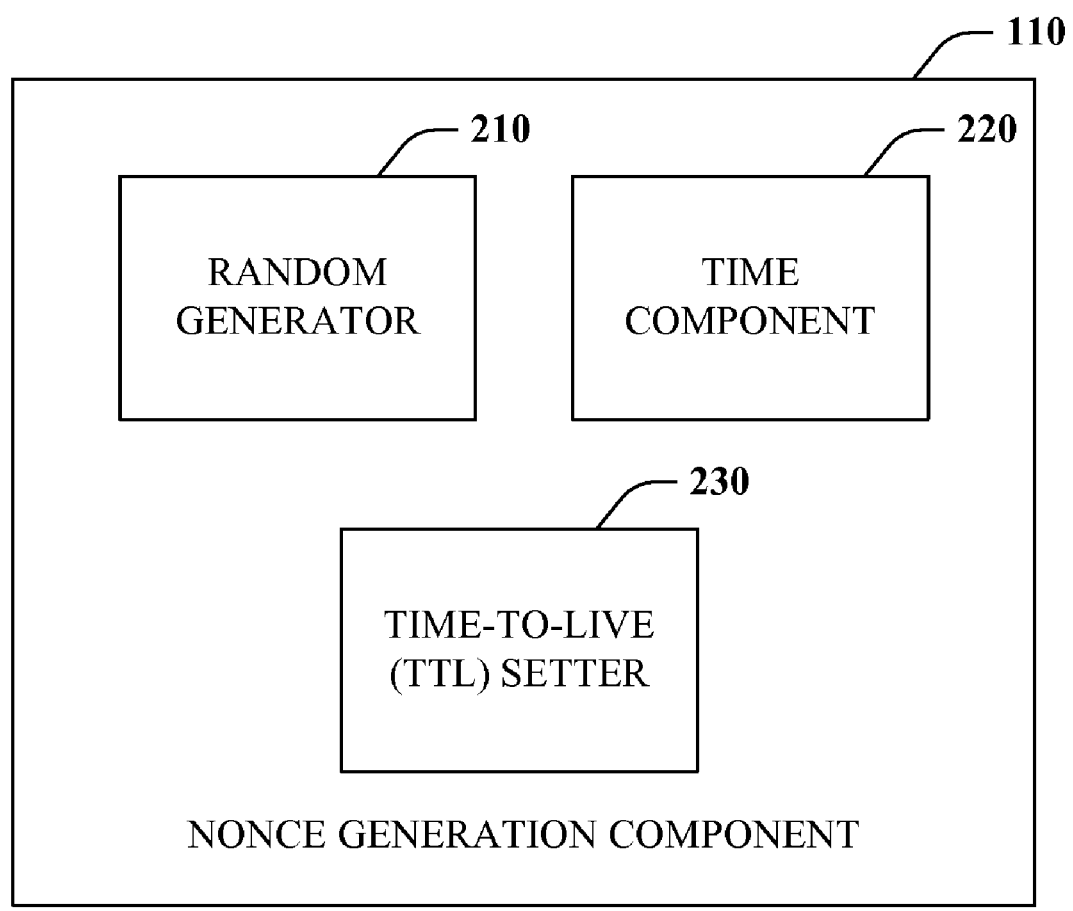
FIG. 2 is a block diagram of a representative nonce generation component according to a disclosed aspect.

FIG. 2 depicts a representative nonce generation component 110 in accordance with an aspect of the claimed subject matter. As previously described, the nonce generation component 110 generates a unique identifier to be added to the domain name for the purpose of confounding caching. The actual nonce can be produced in a myriad of ways. As shown here, the nonce generation component 110 includes a random generator 210 (a component as that term is used herein) and a time component 220. The random generator 210 can generate a random or pseudo random number and/or string of characters as the nonce. Alternatively, the time component 220 can generate a nonce as a function of a current time (e.g., hour, minutes, day, month, year . . . ). The added advantage of adding meaningful data such as time, in particular, is that expiration periods are more easily set and enforced (e.g., one hour). The nonce generation component 110 can also include a time-to-live setter component 230. Where a nonce is generated that expires after a period of time, the component 230 can set the TTL to match the expiration time so that the intent of the nonce is clearly communicated.

Figure 3:
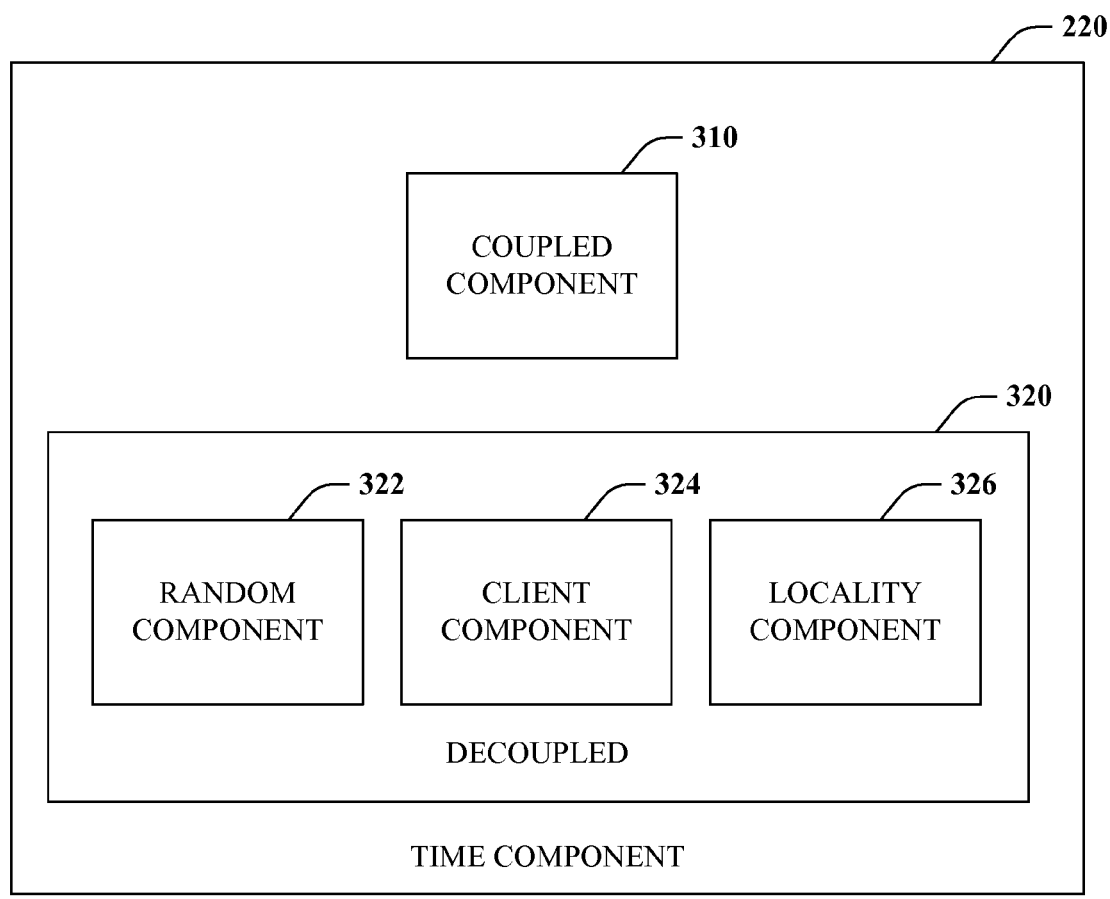
FIG. 3 is a block diagram of a representative time component in accordance with a disclosed aspect of the subject matter.

Turning to FIG. 3, a representative time component 220 is illustrated in further detail according to a claimed aspect. Generating nonces as a function of time (a.k.a. time-rounded nonce), is advantageous in that it easily allows some measure of caching to be employed as opposed to a pure nonce approach that eliminates all caching. Rather than using a completely random nonce, the nonce is a function of the current time. The time component 220 can include coupled and decoupled components 310 and 320, respectively.

The coupled component 310 is a mechanism for generating nonces that are coupled in time. For example, if a site maintainer wishes to cache DNS records for up to an hour, a function can be used that is constant within each hour and changes each time the hour changes. In the simplest embodiment, the nonce is the current date and hour as in "2008-01-17-10.example.com." During the 10 o'clock hour, all clients will use this nonce and thus clients, networks, and services will benefit from the caching of the record. At 11 o'clock, all clients will begin using the new nonce "2008-01-17-11," which has not been used before thus requiring a query to an authoritative server. This provides the server with an opportunity to return an updated mapping to back-end servers, amongst other components or systems.

Various embodiments are possible for coupled nonces, as will be described further below. For example, the nonces can be client and/or server generated. Regardless of the embodiment, all coupled time-based nonce approaches have the benefit of restoring the use of caching to reduce load on servers while preserving a DNS maintainer's privilege of bounding a caching period. The same approach also produces a synchronized load on an authoritative server. While caching means that the server is burdened with less load, the load it serves is synchronized at the turn of the hour, for instance. In other words, synchronization occurs at the point at which all of the in-phase clients simultaneously expire their previous nonce and introduce a new one. As a result, the server needs to be provisioned for the same peak load as if caching were not available.

The decouple component 320 mitigates this issue by phase or time shifting the value of a time-bound nonce. Stated differently, the nonces are thus decoupled from one another. This can be accomplished in many different ways. As illustrated, the decoupled component 320 can include random component 322, client component 324, and/or locality component 326. Each subcomponent provides a different mechanism for decoupling nonces.

The random component 322 generates a random or pseudo random number as at least a basis for a nonce, for instance by identifying phases. By way of example, a value from zero to five can be selected randomly. Suppose the value is two. When generating a time-based nonce, an hour can be defined to begin at 10:20 and end at 11:19. During that period, requests can be defined as "2008-01-17-10-20.example.com," for instance. (Similarly, if the randomly selected value is four, the hour can be specified as 10:40 to 11:39 and requests can be denoted "2008-01-17-10-40.example.com.") All "two" clients will be phase-shifted, so that their fresh, uncached requests occur at 10:20. In this case, total load will be spread over six peaks corresponding to the six possible phases (0, 1, 2, 3, 4, and 5). Of course, the number of distinct phases need not be six; it can be any value "n."

Phase/time-shifting incurs a tradeoff. For small values of "n," the peak DNS server load is reduced by a small factor "n." For large values of "n," the effectiveness of caching is reduced since records retrieved for the client population in one phase cannot be served out of cache to clients requesting another phase. This can be referred to as a temporally overlapped phase bias.

Another decoupled approach is to assign or associate particular phase values with clients, rather than randomly selecting a phase value for each request. The client component 324 is a mechanism for determining or assigning phase values to clients and generating a nonce based thereon. In this instance, clients in different phases use the phase value to determine when the expiration period has elapsed thus offsetting their expirations from one another. This means that each client in any phase requests the same 10 o'clock nonce for a one-hour period, but the periods overlap depending on the phase associated with a client. For example, the phase zero clients request a period of 10:00-11:00, whereas phase five clients request the same URL from 10:50-11:49.

Like all approaches, this client approach has particular issues. First, it effectively doubles the expiration period achieved with a given server load. Second, while phase-shifting causes individual clients to offset their requests, caches that aggregate over a larger number of clients will, in general, have at least one client in phase zero and thus will still synchronize their requests at the beginning of the hour, resulting in an undesirable peak in server load.

Additionally or alternatively, the locality component 326 can provide a locality enhancing phase bias. In this scenario, a phase can be selected as a function location ascertained from a client IP address or local DNS name, for example. The rightmost components of a DNS name and the high-order bits of an IP address are correlated with the network locality of a client and caching facilities are also correlated with the network locality of a client. Using client locality information to select a phase may therefore cause many caches to see requests for only a subset of the available phases. This reduces the number of requests such caches make to the authoritative DNS server. Therefore, the phase bias spreads the peak load, but the locality preservation exposes this benefit without a proportional decrease in the effectiveness of the caches.

Figure 4:
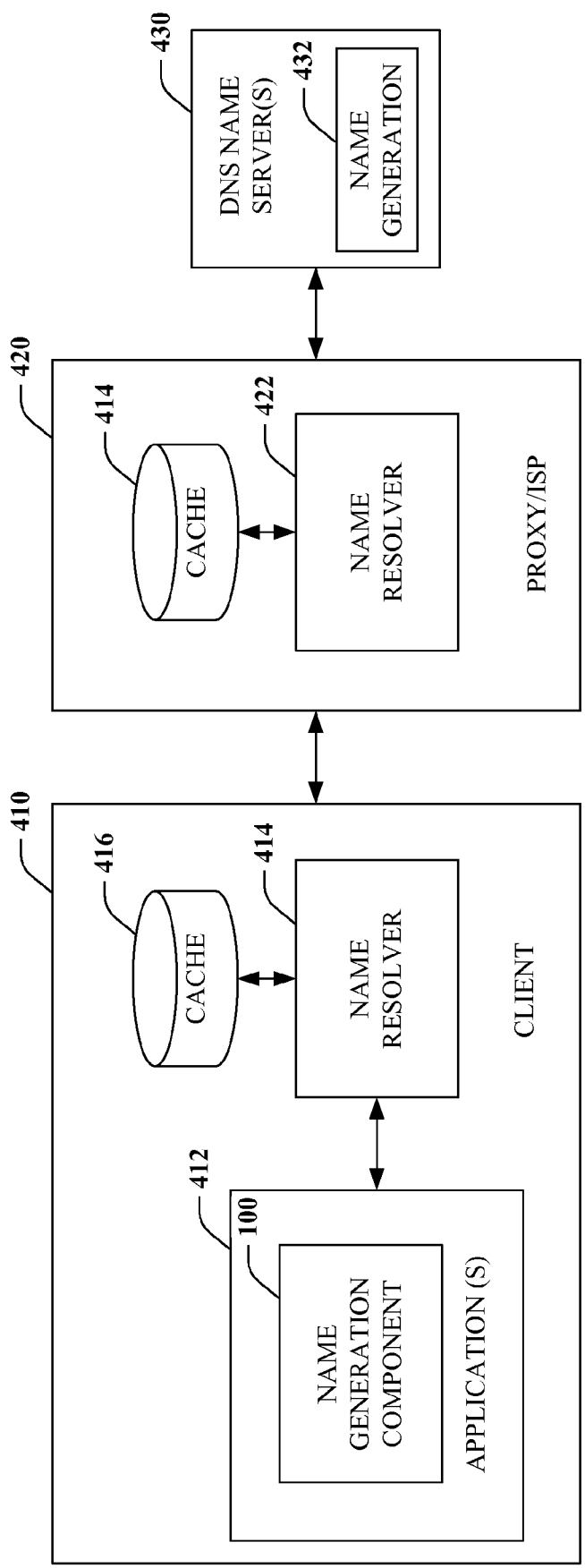
FIG. 4 is a block diagram of a exemplary client based embodiment of the disclosed subject matter.

Referring to FIG. 4, a system 400 illustrates a client-based embodiment of aspects of the claimed subject matter. As shown, the system 400 includes a client machine 410, a proxy server or Internet service provider 420 and domain name server(s) 430. The client 410 includes an application 412 that requires resolution of a domain name such as a web browser or email application, among others. Furthermore, the client 410 includes a local resolution system comprising name resolver component 414 and cache 416. Upon receipt of an address from the application 412, the resolver component attempts to locate the address in cache 416. If it is housed in cache 416, the resolver simply returns the address to the application 412. Alternatively, the resolver can query the proxy server/Internet service provider 420 for the address. The server 420 comprises similar components, namely a name resolver component 422 and a cache store 414. The name resolver 422 searches cache 414 and returns an address if located. Alternatively, the server component 420 can query an authoritative DNS server 430 to determine the address and propagate it back to the application.

Unlike conventional systems, the application component 412 includes a name generation system 100, as previously described. In brief, the name generation component 110 adds a unique identifier or nonce to a domain name such as a random string of numbers. A new domain name can be generated for every request, only once per session, or upon expiration, for example. In any event, upon generation of the new domain name it is unlikely that any local and/or intermediate mechanism will have cached the domain name to IP address mapping. Accordingly, this forces propagation all the way to the authoritative server 430 ensuring that a fresh, correct mapping is returned.

By way of example, active content can be injected into a web page on a client. The active content can dynamically generate nonce-bearing domain names for URLs. For instance:

```
<iframe id="target" src="http://www.w3c.com"></iframe>
<script type="text/javascript">
    var url = "http://"+parseInt(Math.random( )*1e9)+".example.com";
    document.getElementById("target").src = url;
</script>
```

This code snippet generates a URL including a random number nonce that is employed to retrieve a web page. This approach defeats HTTP-layer caches, since the nonce is generated in imperative code on the client. Furthermore, the pure nonce approach above has the benefit of eliminating all intermediate caching, giving the site maintainer complete control over the DNS records observed by clients at the expense of handling one DNS request for every client session.

As another example, consider a time-rounded nonce situation as specified in the following code segment:

```
<iframe id="target" src="http://www.w3c.com"></iframe>
<script type="text/javascript">
    var expiration = 300;      // 300 seconds = 5 minutes
    var sec = (new Date( )).getTime( )/1000;
    var timeBoundedNonce = parseInt(sec/expiration);
    var url = "http://"+timeBoundedNonce+".example.com";
    document.getElementById("target").src = url;
</script>
```

In this example, the mechanism is more general than hourly expiration, as previously described. Here, the expiration time is specified in seconds (e.g., 300) as a parameter to the code. With this client-generated nonce approach, the client code embeds information (e.g., expiration time) that the "example-.com" site administrator wishes to control.

The authoritative DNS server 430 includes a name generation subcomponent 432. Since unique domain names are generated on the client, the server should be aware of these to enable proper mapping. To that end, the name generation component 432 can be designed to produce the same nonce and domain name as produced by the client component of the same name. The domain names could then be matched and the mapped IP address returned. Additionally or alternatively, the name generation component 432 can assist in identifying the added nonce and stripping the nonce from the name thereby revealing the original domain name upon which mapping is specified.

Figure 5:
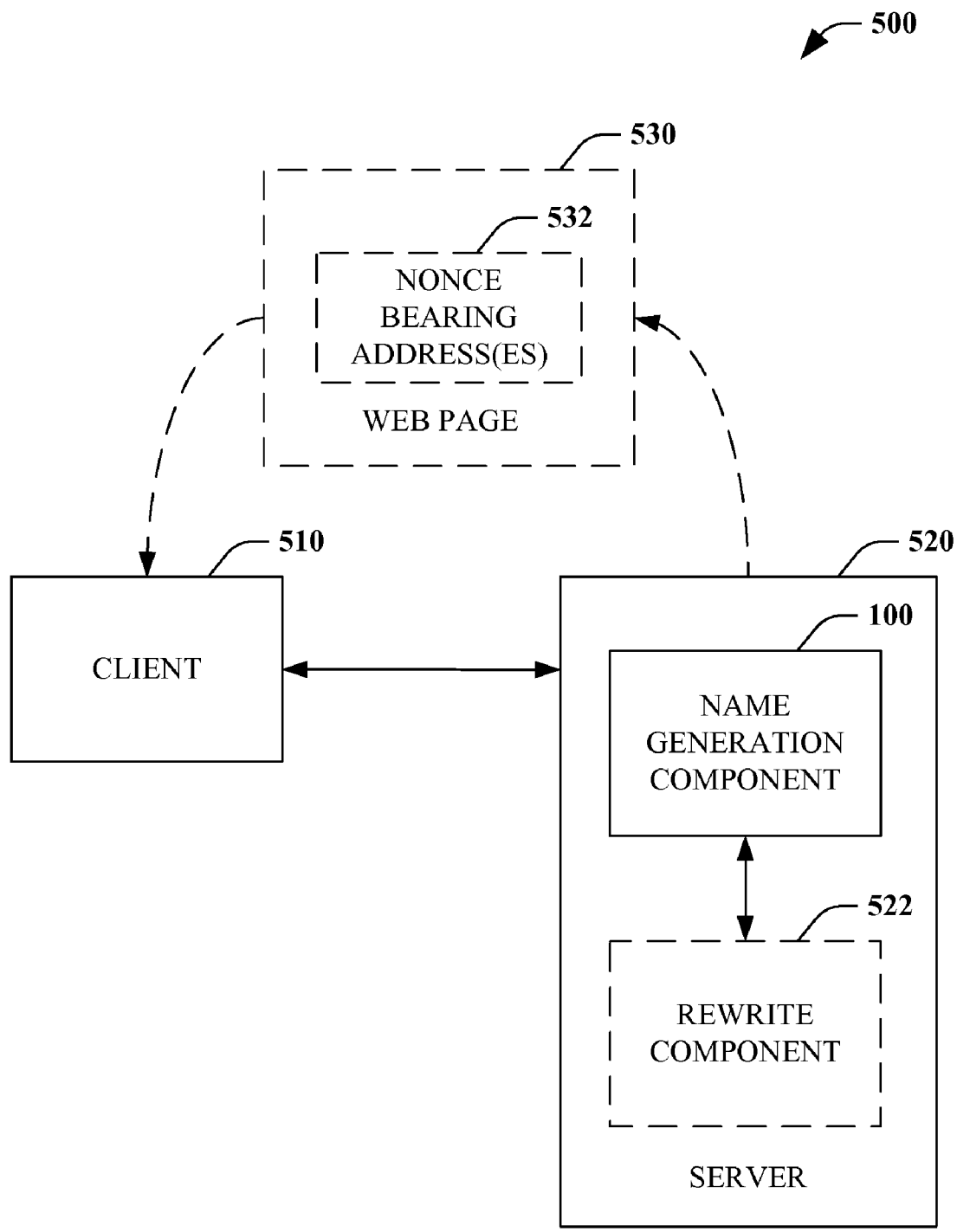
FIG. 5 is a block diagram of an exemplary server based embodiment of aspects of the disclosed subject matter.

Turning attention to FIG. 5, an exemplary server based system 500 is depicted in accordance with an aspect of the claimed subject. As shown, a client 510 interacts with a server 520. For instance, the client 510 can request a web page 530 from the server 520. In this embodiment, the server 520 includes the name generation component 100, as previously described. Furthermore, the server 520 includes a rewrite component 522 that rewrites embedded web page URLs to include nonce-bearing domain names 532.

As discussed above, a client generated approach embeds code to control expiration, for instance, as desired by a site administrator. However, in some cases it is undesirable to have thousands of distributed referring pages incorporate such a script lexically, since the expiration time would thus be essentially unchangeable. Therefore, it is desirable instead that the script above be served from an "example.com" server, and referring pages incorporate it by reference:
<script    src="http://scripts.example.com/reference-script.js"/>
This gives the "example.com" administrator the opportunity to change the expiration period, a task that is unlikely to happen as frequently as changing the actual DNS mapping to a set of back-end servers, but nevertheless should remain under control of the site's DNS administrator.

Figure 6:
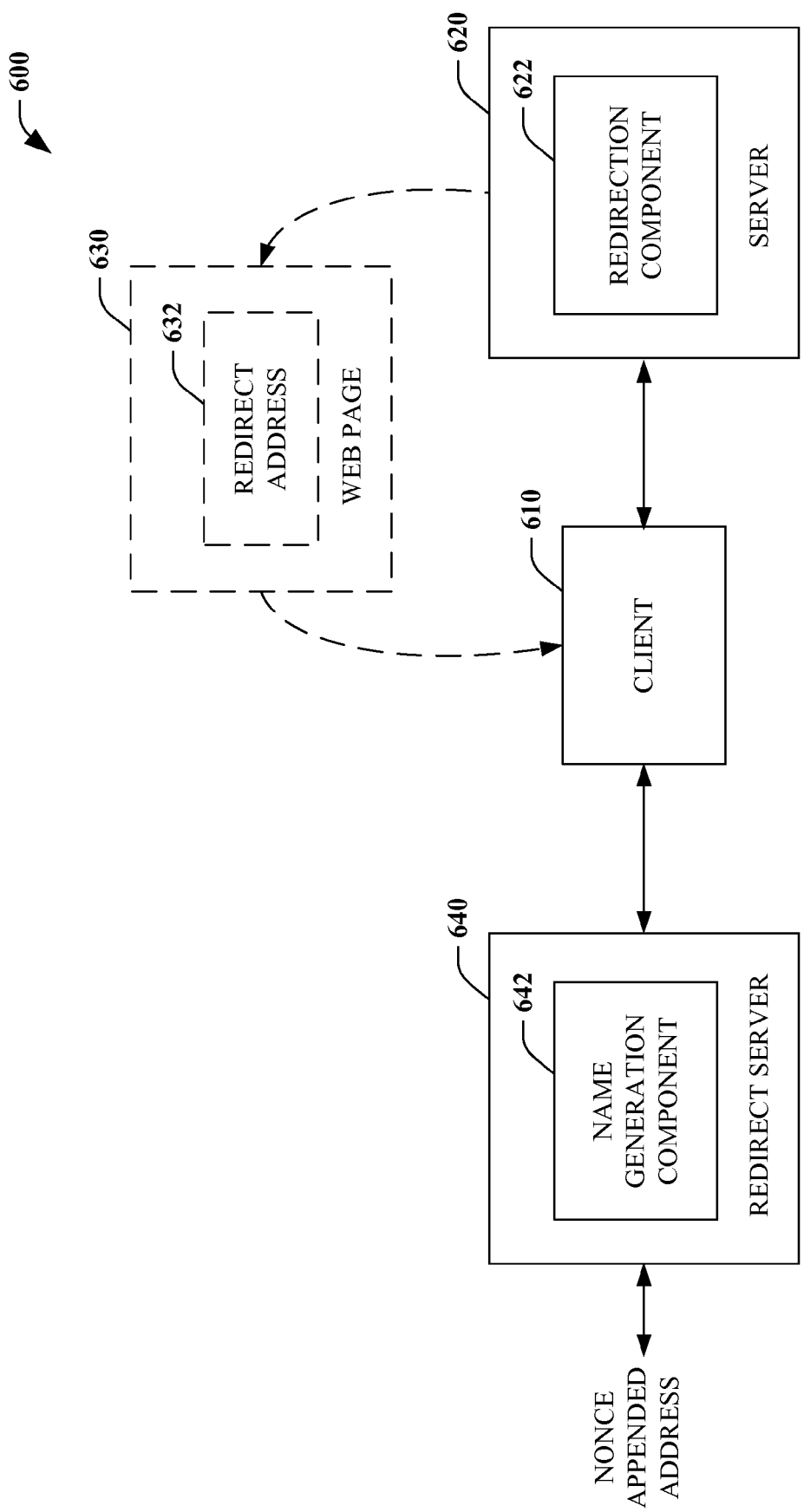
FIG. 6 is a block diagram of an exemplary redirected server embodiment of aspects of the disclosed subject matter.

FIG. 6 depicts a server-based redirection system 600 in accordance with an aspect of the claimed subject matter. Similar to system 500 above, the system 600 moves name generation to another server and/or service (e.g., local or remote). As shown, a client 610 can request data, such as a web page 630, from a server 620. Rather than a name generation component 100, the server 620 can include a redirection component 622 that injects or rewrites domain name addresses to redirect to another server or service 640. In this instance, the resultant web page 630 includes a redirect address 632 that corresponds to a referred web page. In the ongoing example, the address can be "redirect.example.com." Upon client 610 navigation to the redirect address 632, the server or service 640 at that address can utilize name generation component 100 to produce a nonce-bearing address, changing the nonce at each request, for instance. Again, this nonce-bearing address can be utilized to retrieve a DNS record from an authoritative server (not shown).

The inventors note one possible issue with both direct and redirect server-generated nonce approaches. In particular, transparent intermediate HTTP-layer caches may cache the HTTP result (e.g., the original page containing the nonce in the direct case, or the redirection result in the redirect case) enabling the DNS-layer caches to cache the nonce-containing record and thus preventing the technique from achieving total freshness.

It is to be noted that aspects of the claimed subject matter can be executed at various protocol levels. The description has focused on higher-level protocol particularly a web stack including HTTP, HTML, and client side active code (e.g., JavaScript). However, some or all of the approaches described can be made to work with other application layer stacks, among others. In fact, the approaches can be implemented at a lower IP-address level. For example, "example.com" might map to {10.0.11} statically, and then a network address translator (NAT) can be employed to dynamically route network sessions to the actual internal IP address of back end servers. However, this can result in considerably more expense because of its position in the IP stack the Nat translator needs to maintain state for every active session and further most be involved in translating every packet between client and server rather than once per client session, for instance.

The aforementioned systems, architectures, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems above and methods below can include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flow charts of FIGS. 7-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Figure 7:
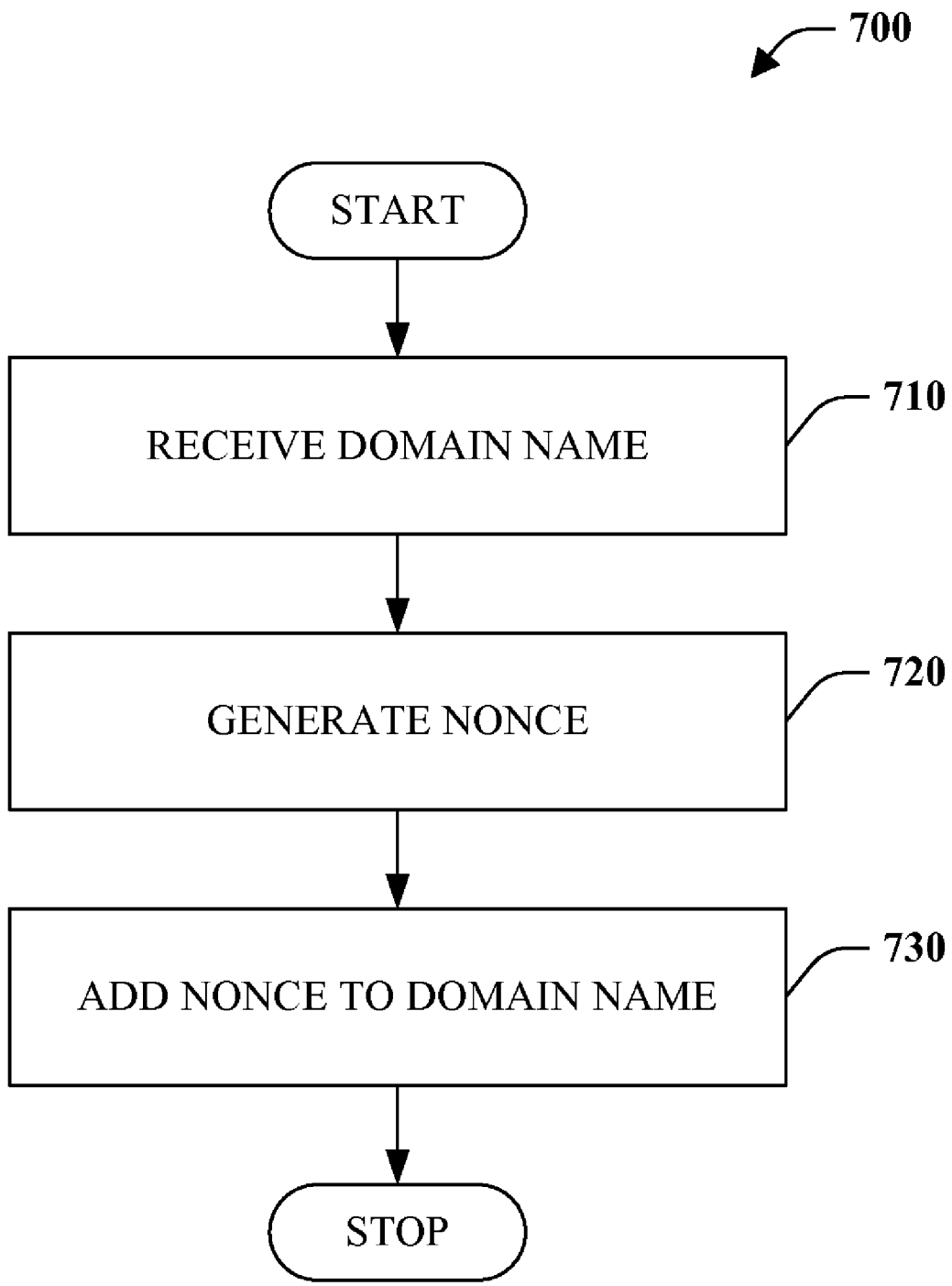
FIG. 7 is a flow chart diagram of a method of domain name generation in accordance with an aspect of the disclosed subject matter.

Referring to FIG. 7, a method of domain name generation 700 is illustrated in accordance with an aspect of the claimed subject matter. At reference numeral 710, a domain is received, for example associated with a web page URL or email address, among others. At numeral 720, a nonce is generated. The nonce can be a unique alphanumeric string. This string can be generated at random by a random/pseudo random number generator or as a function of some other information such as time. At reference 730, the nonce is added or appended to the domain name. For instance, "example.com" becomes "12345.example.com."

By injecting a nonce into a domain name, caching can be controlled to increase responsiveness to changes in domain to IP address mappings. Since the new nonce-bearing domain name is unlikely to have been produced by any client, no such request will have been cached by any caching layer. Thus, every request is propagated to an authoritative name server where the maintainer has control and can return a fresh and correct mapping to one or more backend servers. Moreover, new nonces and nonce-bearing names need not be produced for every request. In one instance, they can be generated once per client session. Additionally or alternatively, the nonce can be regenerated as a function of time. In these scenarios, caching and the benefits afforded thereby can be leveraged, but in a controlled manner.

It is to be noted that the method 700 can be employed on a client and/or a server. For example, nonces can be generated on a client device via active code. Alternatively, nonces can be generated directly or indirectly on servers. Further yet, a backend authoritative server can utilize this method to generate the new nonce-bearing domain names to facilitate matching of DNS records including domain name to IP address maps.

Figure 8:
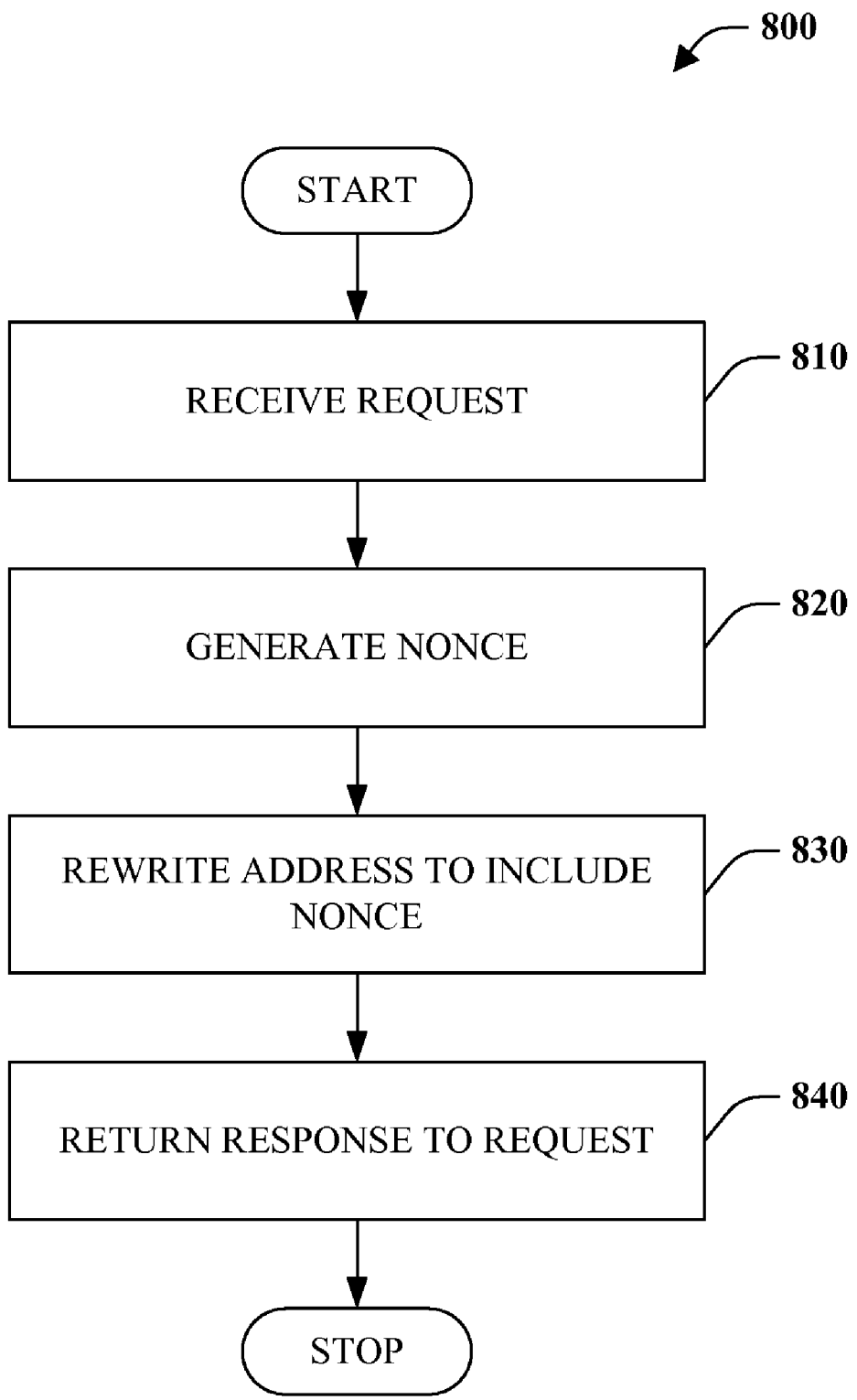
FIG. 8 is a flow chart diagram of a direct server name generation method according to a disclosed aspect.

FIG. 8 illustrates a method of direct server name generation 800 according to an aspect of the claimed subject matter. At reference numeral 810, a request is received for a site such as a web page by way of URL. A nonce is generated at numeral 820 in accordance with a particular approach (e.g., random, time-rounded . . . ). At reference 830, referring addresses or URLs are rewritten to include nonce-bearing domain names. For example, a referring link "http://www.example.com/main/index.htm" can be rewritten as "http://www.2008-1-19-10.example.com/main/index.htm." The requested site or page can subsequently be returned in response to the request with the nonce-bearing domain names, at reference 840. As a result, navigation of the returned web page, for instance, causes IP address lookup to go back to an authoritative server at least once for these rewritten addresses.

Figure 9:
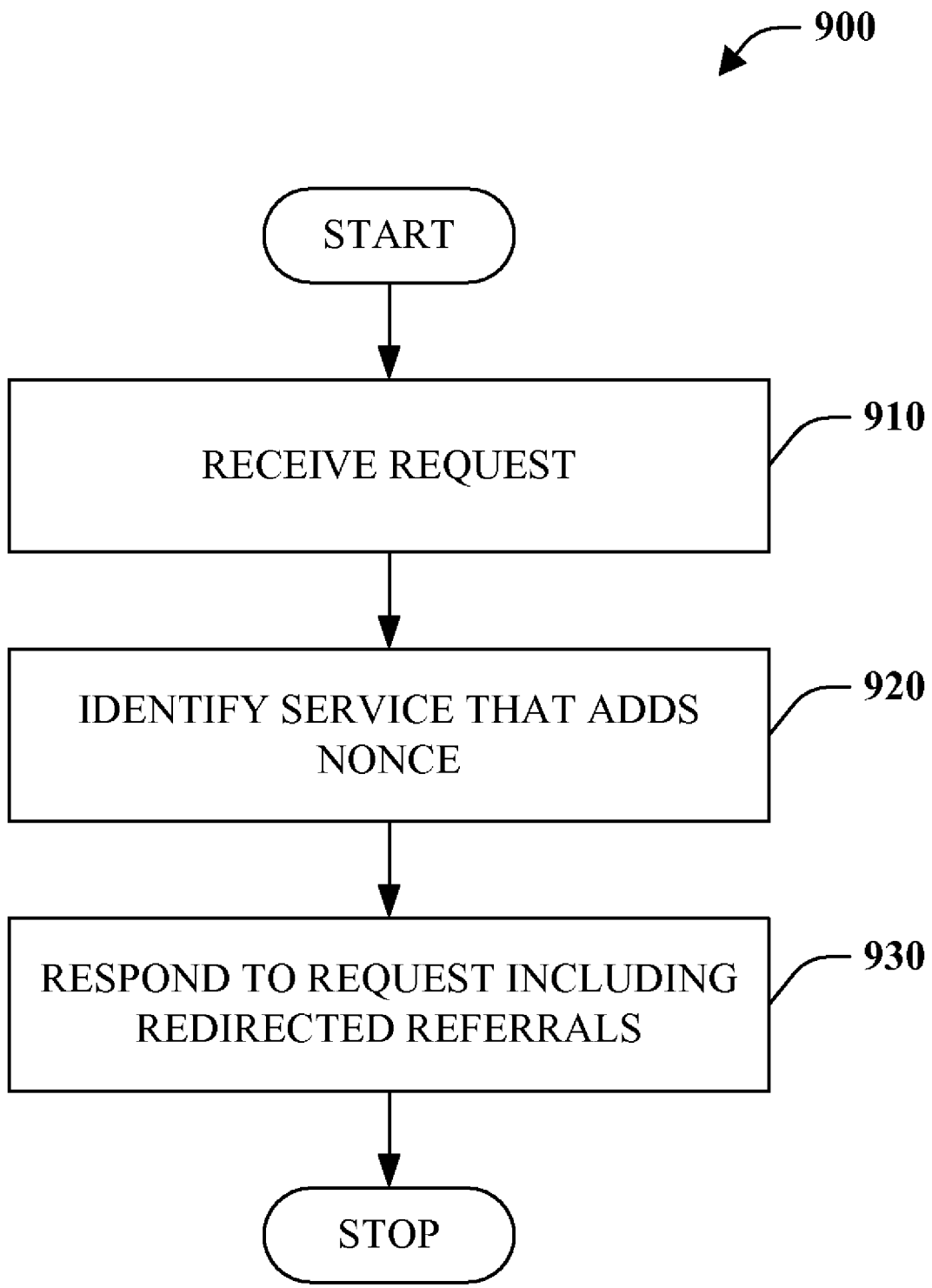
FIG. 9 is a flow chart diagram of a redirected server name generation method in accordance with a disclosed aspect.

Turning to FIG. 9 a redirected server name generation method 900 is depicted in accordance with an aspect of the claimed subject matter. At reference numeral 910, a request is received for a web site or page, for example. This can be the case, if a server is the provider of the requested web page. At numeral 920, a service and/or service is identified that injects a nonce to produce a nonce-bearing domain name. At reference numeral 930, the requested page is returned in which referral addresses or links are modified to enable redirection to the identified service and/or server. Subsequently, when a client navigates to such a link a redirection service and/or server appends a nonce to produce a nonce-bearing domain name within a URL, for instance, which can then be mapped to the appropriate IP address.

Figure 10:
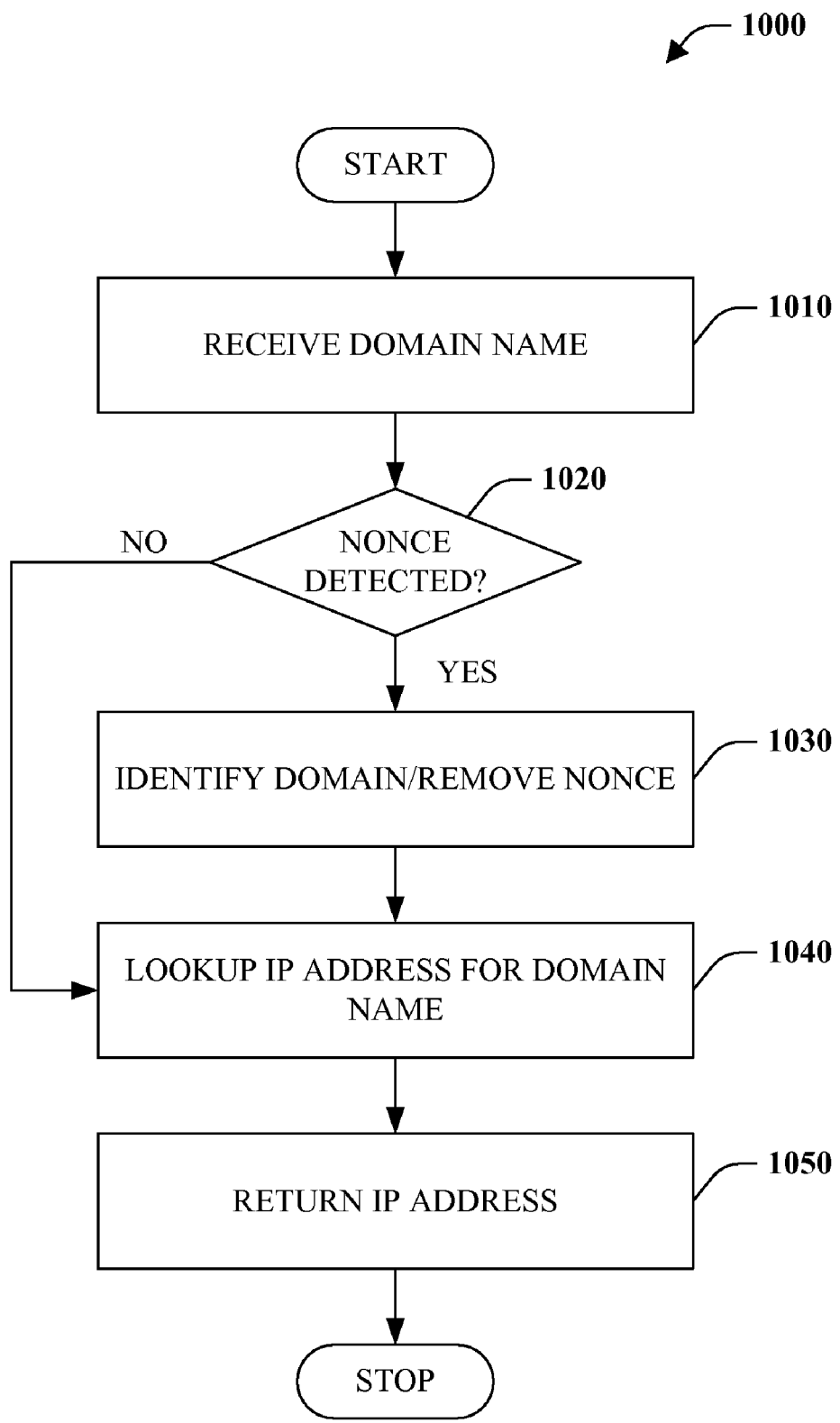
FIG. 10 is a flow chart diagram of an authoritative domain name method according to an aspect of the disclosure.

Referring to FIG. 10, an authoritative domain name method 1000 is depicted in accordance with an aspect of the claimed subject matter. At numeral 1010, a domain name is received. For example, a client application such as a web browser or email application can provide the domain name seeking the associated IP address. Unlike conventional resolution methods, a determination is made as to whether a nonce is included with the domain name at reference 1020. If it is determined that the domain name does not include a nonce, the method continues at reference numeral 1040 where the IP address for the domain name is looked up. Alternatively, if it is determined at 1020 that a domain name bears a nonce, the method proceeds to 1030. At reference numeral 1030, the domain is identified and/or nonce removed. In one instance, the nonce bearing domain name can be generated and maintained utilizing a corresponding deterministic algorithm such that received nonce bearing names can be matched directly. Alternatively, a nonce can be identified, perhaps by local generation thereof, and removed revealing the original domain name for matching. At reference numeral 1040, the associated IP address is identified by locating a DNS record. The identified IP address is then returned to an entity that provided the domain name at reference 1050.

The term "nonce" as used herein is intended to refer to a unique identifier. As used in security engineering, the word "nonce" stands for number used once. However, "nonce" need not be limited to a number. It can comprise numbers, symbols, and/or characters, among other things. The term "nonce" may also be referred to as a serial number, sequence number, uniquifier, or a distinguisher consistent with the above definition.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated that a myriad of additional or alternate examples of varying scope could have been presented, but have been omitted for purposes of brevity.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 11:
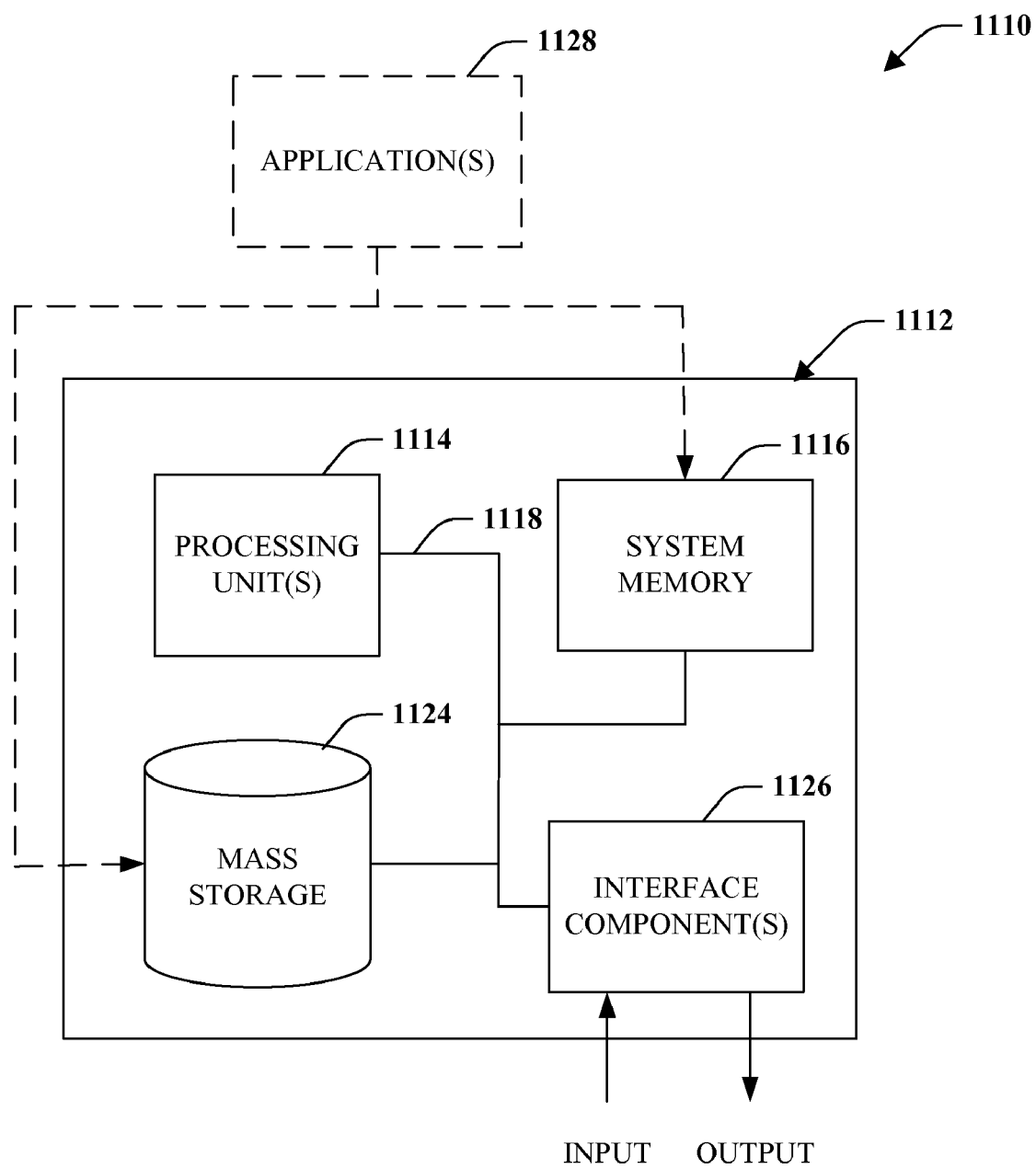
FIG. 11 is a schematic block diagram illustrating a suitable operating environment for aspects of the subject disclosure.
Figure 12:
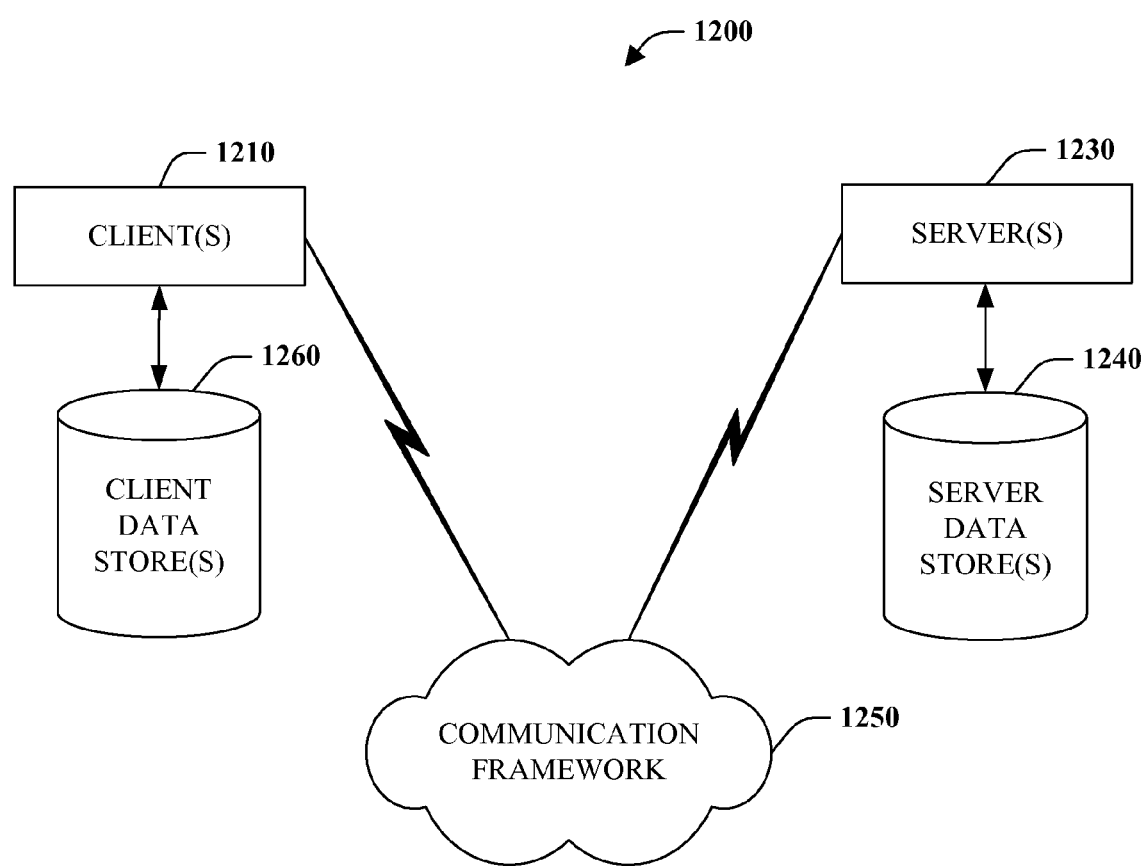
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented.

While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 11, an exemplary environment 1110 for implementing various aspects disclosed herein includes a computer 1112 (e.g., desktop, laptop, server, hand held, programmable consumer or industrial electronics . . . ). The computer 1112 includes a processing unit 1114, a system memory 1116, and a system bus 1118. The system bus 1118 couples system components including, but not limited to, the system memory 1116 to the processing unit 1114. The processing unit 1114 can be any of various available microprocessors. It is to be appreciated that dual microprocessors, multi-core and other multiprocessor architectures can be employed as the processing unit 1114.

The system memory 1116 includes volatile and nonvolatile memory. The basic input/output system (BIOS), containing the basic routines to transfer information between elements within the computer 1112, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1112 also includes removable/non-removable, volatile/non-volatile computer storage media. FIG. 11 illustrates, for example, mass storage 1124. Mass storage 1124 includes, but is not limited to, devices like a magnetic or optical disk drive, floppy disk drive, flash memory, or memory stick. In addition, mass storage 1124 can include storage media separately or in combination with other storage media.

FIG. 11 provides software application(s) 1128 that act as an intermediary between users and/or other computers and the basic computer resources described in suitable operating environment 1110. Such software application(s) 1128 include one or both of system and application software. System software can include an operating system, which can be stored on mass storage 1124, that acts to control and allocate resources of the computer system 1112. Application software takes advantage of the management of resources by system software through program modules and data stored on either or both of system memory 1116 and mass storage 1124.

The computer 1112 also includes one or more interface components 1126 that are communicatively coupled to the bus 1118 and facilitate interaction with the computer 1112. By way of example, the interface component 1126 can be a port (e.g., serial, parallel, PCMCIA, USB, FireWire . . . ) or an interface card (e.g., sound, video, network . . . ) or the like. The interface component 1126 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 1112 to output device(s) via interface component 1126. Output devices can include displays (e.g., CRT, LCD, plasma . . . ), speakers, printers and other computers, among other things.

FIG. 12 is a schematic block diagram of a sample-computing environment 1200 with which the subject innovation can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing the aspects of the subject innovation, for example. One possible communication between a client 1210 and a server 1230 may be in the form of a data packet transmitted between two or more computer processes.

The system 1200 includes a communication framework 1250 that can be employed to facilitate communications between the client(s) 1210 and the server(s) 1230. The client(s) 1210 are operatively connected to one or more client data store(s) 1260 that can be employed to store information local to the client(s) 1210. Similarly, the server(s) 1230 are operatively connected to one or more server data store(s) 1240 that can be employed to store information local to the servers 1230.

Client/server interactions can be utilized with respect with respect to various aspects of the claimed subject matter. For example, a client 1210 can generate a nonce bearing address and provide it to a domain name server 1230 for resolution, bypassing caching layers. In another instance, a server 1230 can produce and inject nonces in web pages returned to requesting clients 1210. Still further, a first server 1230 can generate addresses directing requests from clients 1210 to a second server 1230 for generation of a nonce-bearing domain name.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

What is claimed is:

1. A system to control caching duration of mappings between domain names to Internet protocol (IP) addresses, comprising:
    a memory having computer executable components stored thereon; and
    a processor, operatively coupled to the memory, the processor configured to execute the computer executable components, the computer executable components comprising:
        a generation component configured to generate a series of nonces; and
        a constructor component configured to individually append the series of nonces to a domain name to form a varying nonce-bearing name, wherein the varying nonce-bearing name varies as a function of time and is configured to force propagation of IP address lookup to an authoritative server.

2. The system of claim 1, the constructor component coupled to a server, wherein the server is configured to facilitate generating the varying nonce-bearing name.

3. The system of claim 2, the server configured to replace a domain name of a uniform resource locator (URL) with the varying nonce-bearing name.

4. The system of claim 2, the server configured to redirect requests to another server, the another server configured to replace a domain name with the varying nonce-bearing name.

5. The system of claim 1, the constructor component coupled to a client device, wherein the client device is configured to facilitate generating the varying nonce-bearing name.

6. The system of claim 5, the constructor component configured to generate the varying nonce-bearing name on the client device from web browser active code.

7. The system of claim 1, wherein at least one of the series of nonces comprises at least one of a number or a string, the number being either random or pseudo-random.

8. The system of claim 1, the generation component configured to generate at least one of the series of nonces as a function of time.

9. The system of claim 8, the generation component configured to generate the at least one of the series of nonces based on a time-to-live (TTL) property that identifies an expiration period imposed to communicate an intent.

10. The system of claim 9, the time shift is a function of one of a random number, a client identity, or client locality.

11. The system of claim 8, the generation component configured to time shift the at least one of the series of nonces to reduce a load on an authoritative server.

12. A method of controlling caching of domain name records, comprising:
    employing a processor to execute computer executable instructions stored on a computer readable storage medium to implement the following acts:
    generating a series of unique identifiers; and
    modifying a varying domain name based on the series of unique identifiers and as a function of time, the varying domain name sequentially including a different one of the series of unique identifiers to control caching of an Internet protocol (IP) address.

13. The method of claim 12, further comprising varying the different one of the series of unique identifiers once for each client session.

14. The method of claim 12, further comprising varying the different one of the series of unique identifiers as a function of time.

15. The method of claim 14, further comprising generating a phase shifted identifier.

16. The method of claim 12, further comprising transmitting a domain name to a server for IP address resolution.

17. A computer-readable storage medium comprising:
    computer-readable instructions, the computer-readable instructions including instructions for causing at least one processor to perform the following acts:
    generating a series of varying nonce-bearing domain names, wherein the series of varying nonce-bearing domain names vary as a function of time; and
    provisioning the series of varying nonce-bearing domain names to a client device in response to a request.

18. The computer-readable storage medium of claim 17, further comprising rewriting a uniform resource locator (URL) with a corresponding nonce-bearing domain name referenced in a requested web page.

19. The computer-readable storage medium of claim 17, further comprising redirecting a request to a dedicated server to facilitate the generating and the provisioning.

20. The computer-readable storage medium of claim 19, the redirecting a request comprising rewriting a uniform resource locator in a requested web page to reference the dedicated server.

* * * * *